United States Patent [19]

Usui et al.

[11] Patent Number: 5,494,875
[45] Date of Patent: Feb. 27, 1996

[54] ALUMINA-CONTAINING CARRIER AND HYDROFINING CATALYST FOR HYDROCARBON OILS

[75] Inventors: Kazushi Usui; Shigenori Nakashizu; Kentarou Ishida; Eiko Kogure, all of Saitama, Japan

[73] Assignees: Cosmo Research Institute; Cosmo Oil Co., Ltd., both of Tokyo, Japan

[21] Appl. No.: 90,451

[22] Filed: Jul. 13, 1993

[30] Foreign Application Priority Data

Jul. 14, 1992 [JP] Japan ..................... 4-209680

[51] Int. Cl.⁶ ............... B01J 21/04; B01J 23/28
[52] U.S. Cl. ............. 502/206; 502/207; 502/314; 502/322; 502/355; 208/217
[58] Field of Search ................. 502/314, 332, 502/355, 206, 207, 322

[56] References Cited

U.S. PATENT DOCUMENTS

| | | | |
|---|---|---|---|
| 4,097,413 | 6/1978 | Simpson | 502/314 |
| 4,179,410 | 12/1979 | Simpson | 502/314 |
| 4,472,528 | 9/1984 | Berg et al. | 502/220 |
| 4,766,099 | 8/1988 | Dufresne et al. | 502/84 |
| 4,888,316 | 12/1989 | Gardner et al. | 502/323 |
| 5,008,000 | 4/1991 | Marcilly et al. | 502/67 |
| 5,280,004 | 6/1994 | Iino et al. | 502/314 |

*Primary Examiner*—Anthony McFarlane
*Attorney, Agent, or Firm*—Sughrue, Mion, Zinn, Macpeak & Seas

[57] ABSTRACT

A carrier suitable for preparing a catalyst for hydrofining hydrocarbon oils which has a high ability to eliminate metals contained in the hydrocarbon oils and an improved metal tolerance as well as said catalyst are provided.

The carrier of the present invention is an alumina-containing carrier which shows a peak at 2θ of 27° in the powder X-ray diffraction pattern when carrying Mo and Co or one or more other metals selected from among metals of the groups VIA and VIII in the periodic table together with Mo and Co.

6 Claims, 11 Drawing Sheets

ALUMINA-CONTAINING CARRIER AND HYDROFINING CATALYST FOR HYDROCARBON OILS

FIELD OF THE INVENTION

This invention relates to an alumina-containing carrier and a catalyst for hydrofining hydrocarbon oils. More particularly, it relates to a carrier suitable for the preparation of a hydrofining catalyst being excellent in demetallizing activity and said hydrofining catalyst.

BACKGROUND OF THE INVENTION

Petroleum products obtained by distilling crude oil under atmospheric or vacuum conditions, for example, gas oil, atmospheric residue, vacuum gas oil and vacuum residue frequently contain a number of sulfur compounds the content of which varies depending on the type of the crude oil.

When these hydrocarbon oil components are subjected to combustion, harmful substances such as sulfur compounds are generated. As a result, a combustion chamber is corroded and, further, the atmosphere is contaminated.

In high-ordered processing of the above-mentioned petroleum products such as lightening or improvement in qualities, sulfur compounds, nitrogen compounds and metals contained in these petroleum products would inactivate catalysts and thus seriously disturb the effective utilization of heavy hydrocarbon oils.

Therefore, attempts have been made to eliminate sulfur and metals by contacting hydrocarbon oils containing large amounts of sulfur compounds and metals with catalysts, wherein metals of the group VIA in the periodic table (for example, Mo, Cr, W) or metals of the group VIII metals (for example, Fe, Ni, Co, Pt) are carried on alumina or an alumina-containing carrier, under an elevated hydrogen pressure.

Although such a catalyst can fully eliminate sulfur compounds, metals cannot be fully eliminated thereby in some cases.

In hydrofining atmospheric residue, vacuum residue or vacuum distillate, it is considered to be effective to use a plural number of catalysts differing in pore distribution from each other, as JP-B-49-18763 points out (the term "JP-B" as used herein means an "examined Japanese patent publication").

Specifically, this technique comprises, in a reactor of the fixed bed type, locating a catalyst with a large metal tolerance and having a large pore size in the inlet side followed by a catalyst with a moderate desulfurizing activity and having a moderate pore size, and then locating a catalyst with a high desulfurizing performance and having a small pore size in the outlet side.

This technique is based on an idea that metals contained in the oil to be treated are eliminated in the inlet side of the reactor and the catalyst with a high desulfurizing activity, which is liable to undergo plugging due to metals, in the outlet side is thus protected.

However, fully satisfactory results cannot be achieved even by this technique. Reasons therefor are seemingly as follows.

That is to say, it is thought that a catalyst having a large pore size has a high ability to accumulate metals as the result of the large pore size. However, a catalyst lacking of a high ability to eliminate metals from an oil to be treated cannot be regarded as having an excellent performance, though it has a high ability to accumulate metals.

While taking these points into consideration, the present invention aims at providing a catalyst for hydrofining hydrocarbon oils which has a high ability to eliminate metals contained in the hydrocarbon oils therefrom and a larger metal tolerance as well as a carrier suitable for the preparation of said catalyst.

SUMMARY OF THE INVENTION

The present inventors have conducted various analyses on various hydrofining catalysts differing in demetallizing activity from each other. As a result, they have found out:

(i) among catalysts carrying Co and Mo, one having a characteristic peak at $2\theta=27°$ in the powder X-ray diffraction pattern thereof has a high demetallizing activity; and (ii) among alumina carriers, one having a characteristic peak at $2\theta=27°$ in the powder X-ray diffraction pattern thereof when carrying Co and Mo is excellent as a carrier for a catalyst having a high demetallizing activity and a large metal tolerance;

thus completing the present invention.

Figure 1:
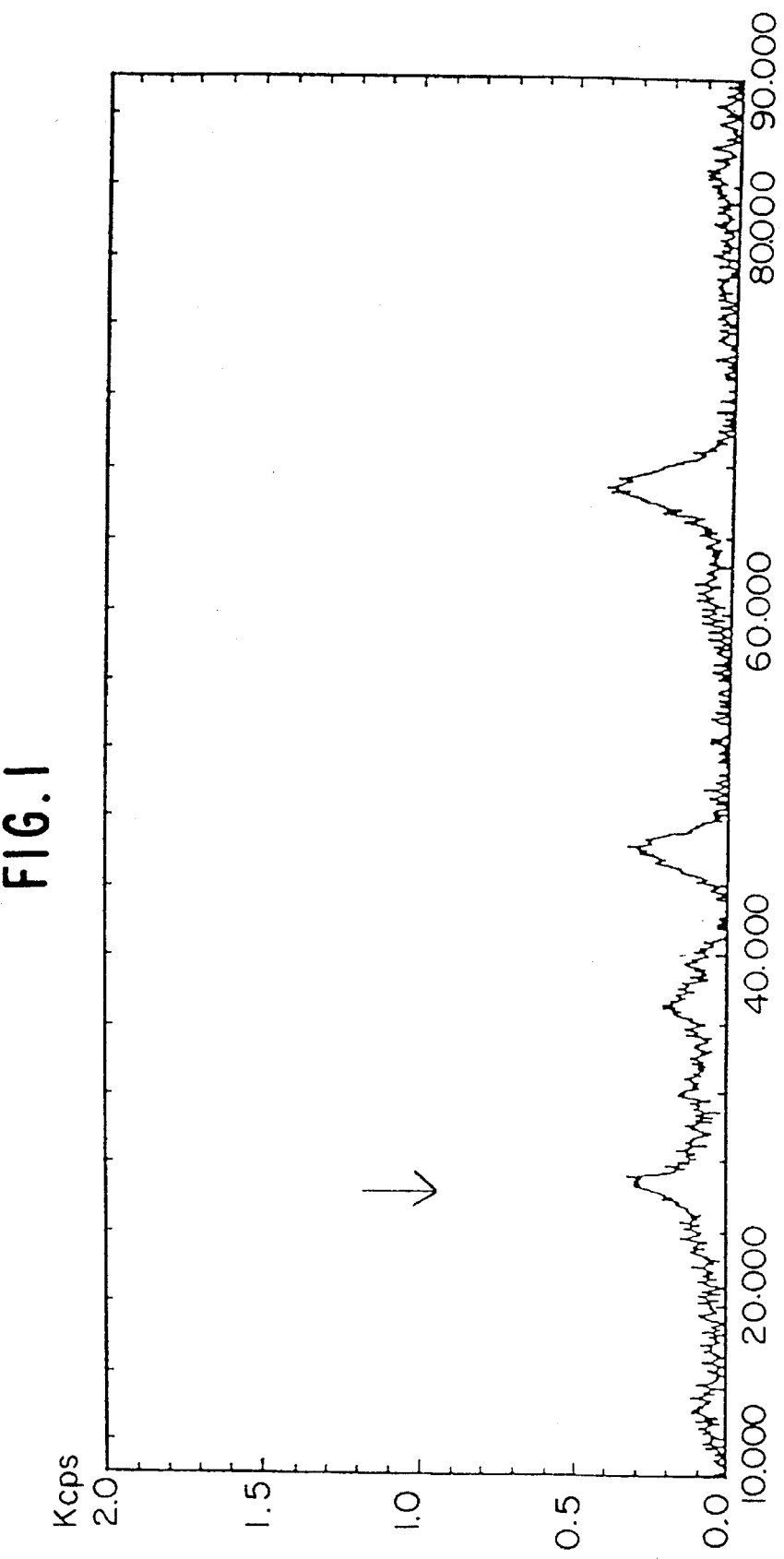
FIGS. 1 to 8 are diagrams showing the powder X-ray diffraction patterns of the catalysts obtained in Examples 1 to 7 and 9, respectively.

In each figure, the abscissa refers to $2\theta$ while the ordinate refers to strength.

DETAILED DESCRIPTION OF THE INVENTION

The alumina-containing carrier according to the present invention means a carrier wherein about 5 to 40% by weight, on the basis of the catalyst, of an inorganic oxide other than alumina is blended with alumina.

As said alumina, either γ-alumina, χ-alumina, η-alumina or a mixture thereof may be appropriately employed.

When an alumina mixture is to be used, the mixing ratio of each alumina component may be arbitrarily selected without restriction.

Examples of the inorganic oxide other than alumina (hereinafter referred to simply as "inorganic oxide") includes oxides of boron, titanium and zinc. Among these compounds, boron oxide is particularly preferable therefor.

The content of the inorganic oxide ranges from about 5 to 40% by weight on the basis of the catalyst, preferably from about 5 to 15% by weight on the basis of the catalyst. When the content of the inorganic oxide is smaller than 5% by weight, the effect of the addition of said inorganic oxide (for example, demetallizing activity) cannot be preferably expressed. When said content exceeds 40% by weight, the above-mentioned effects are not further increased, which brings about an economical disadvantage.

As will be described hereinafter, these inorganic oxides may be blended with alumina by any method such as coprecipitation or kneading. From the viewpoint of easiness in handling, the kneading method is preferable.

The alumina-containing carrier according to the present invention can be obtained by a conventional method.

That is to say, it is prepared by using a water-soluble aluminum compound, such as aluminum sulfate, aluminum chloride, an alkali metal aluminate, an aluminum alkoxide and other inorganic acid salts and organic acid salts as an alumina material.

More particularly, an aqueous alkali hydroxide solution is added to an aqueous acidic aluminum solution (concentration: about 0.3 to 2 mol/l) and an aqueous alkali aluminate solution to thereby form a hydrogel or a hydrosol within a pH range of from about 6.0 to 11.0, preferably from about 8.0 to 10.5. Alternatively, this suspension is heated to about 50° to 90° C. and maintained at this temperature for at least 2 hours while adjusting the pH value by optionally adding aqueous ammonia, nitric acid or acetic acid.

Next, the precipitate (alumina gel) is filtered through a filter and washed with ammonium carbonate and water to thereby remove contaminating ions therefrom.

Subsequently, an inorganic oxide is added thereto by the kneading method.

When the inorganic oxide is to be added by the coprecipitation method, water-soluble compounds such as boron, titanium or zinc may be added to the above-mentioned aqueous solution of the alumina material.

The alumina-containing carrier thus prepared is extruded into a desired shape with the use of an extruder.

The alumina-containing carrier may be in various shapes. Preferable examples thereof include columns, dumbbells which are columns having a section consisting of two small circles connected to each other and those having a trefoil or quatrefoil section consisting of small circles. These small circles may be out of round and ellipses and those close to a rectangle, square or rhombi are also usable.

Further, hollow columns or those having T-, I-, C- or E-sections are usable. Furthermore, honeycombs or columns having triangular, square, pentagonal, hexagonal or octagonal sections may be used therefor.

Such an extruded article is dried at about 100° to 140° C. for several hours and then calcined in the atmosphere at about 600° to 900° C., preferably at about 750° to 870° C., for several hours. Thus the alumina-containing carrier according to the present invention is obtained.

When the calcining temperature is excessively high, the surface area of the carrier becomes smaller and thus a satisfactory amount of active metals cannot be carried thereon. When the calcining temperature is excessively low, the powder X-ray diffraction pattern of the carrier carrying Mo and Co shows no peak at $2\theta$ of about 27° and no excellent demetallizing activity is achieved.

The average pore size of the alumina-containing carrier according to the present invention ranges from 80 to 300 Å, preferably from 80 to 200 Å.

In the preparation of the above-mentioned alumina-containing carrier, the average pore size and pore distribution of the alumina-containing carrier required as the hydrofining catalyst of the present invention can be achieved by controlling the temperature and time during the step of precipitating the hydrate of the above-mentioned alumina material (i.e., preparing the alumina gel) or aging said precipitate, the extruding pressure in the extruding step or the temperature and time in the step of calcining said extruded article.

When the inorganic oxide is boron oxide, the composition of the alumina-containing carrier of the present invention is expressed in $Al_xB_yO_z$ (x=7–15, y=10–20, z= 3(x+y)/2).

As will be described hereinafter, the alumina-containing carrier according to the present invention should have a characteristic peak at $2\theta$ of about 27° in the powder X-ray diffraction pattern thereof when carrying both of Mo and Co which are active components of a hydrofining catalyst.

It is assumed that the peak at $2\theta$ of about 27° in the powder X-ray diffraction pattern is assignable to $CoMoO_4$. A conventional catalyst carrying less than 5% by weight of Co and less than 20% by weight of Mo never shows such a peak. Reasons therefor are seemingly as follows:

(1) Co is incorporated into the carrier as an aluminate and thus $CoMoO_4$ cannot be formed; or (2) since Mo binds to alumina ($Al_2O_3$) via oxygen, the content of liberated Mo is insufficient for forming crystalline $CoMoO_4$.

However, when an inorganic oxide is added to the alumina carrier and calcined within the temperature range as specified above, for instance, boron binds to aluminum via oxygen so as to form $Al_xB_yO_z$ (x=7–15, y=10–20, z=3(x+y)/2). It is assumed that once this bond is formed, $CoMoO_4$ is formed and a peak is observed at $2\theta$ of about 27° even though the amounts of Co and Mo carried on the carrier are respectively less than 5% by weight and 20% by weight.

Namely, an alumina-containing carrier, the powder X-ray diffraction pattern of which shows no such a characteristic peak when carrying Mo and Co, cannot give a catalyst having a high demetallizing activity or a large metal tolerance when applied as a carrier to a hydrofining catalyst of the present invention, even though said alumina-containing carrier is prepared by the above-mentioned method. The reason therefor still remains unknown.

The powder X-ray diffraction is performed by using RINT (a product of Rigaku Denki K. K.) provided with a copper tube ball at a tube voltage of 40 KV, a tube current of 30 mA, a divergent slit of 1°, a scattering slit of 1° and a receiving slit of 0.30 mm.

"$\theta$" in $2\theta$ means the diffraction angle of X-rays in the powder X-ray diffraction.

The "characteristic peak" means a peak newly appearing at $2\theta$ of about 27°.

The hydrofining catalyst according to the present invention is classified into two types, namely, those having Mo and Co carried on the alumina-containing carrier as defined above and showing a characteristic peak at $2\theta$ of about 27° in the powder X-ray diffraction pattern thereof (hereinafter referred to as "the first catalyst") and those having a metal of the group VIA and a metal of the group VIII in the periodic table carried on the alumina-containing carrier and, when both of Mo and Co are carried thereon, showing the characteristic peak (hereinafter referred to as "the second catalyst").

The first catalyst may carry one or more metals of the group VIA in the periodic table other than Mo and/or one or more metals of the group VIII in the periodic table other than Co, in addition to Mo and Co.

The second catalyst may carry either Mo and Co or both of Mo and Co. Alternatively, it may carry neither Mo nor Co.

These first and second catalysts are prepared by the following methods.

In the first catalyst, both of Mo and Co are carried on the alumina-containing carrier as hydrofining active components. In the second catalyst, a definite amount of one or more metals of the group VIA in the periodic table (hereinafter simply called "metals of the group VIA") and one or more metals of the group VIII in the periodic table (hereinafter simply called "metals of the group VIII") are carried thereon as hydrofining active components.

These active components can be carried by any method commonly employed in the art, for example, impregnation or immersion.

When Mo (hereinafter included in the metals of the group VIA employed in the second catalyst) and Co (hereinafter included in the metals of the group VIII employed in the second catalyst) are both carried in the first catalyst or one or more metals of the group VIA and one or more metals of the group VIII are carried in the second catalyst, these metals may be carried either in an arbitrary order or at the same time. However, it is preferable to carry the metals of the VIA group first. This is because when the metals of the group VIII are carried first, these metals of the VIII group form composite oxides with alumina and, as a result, a significantly large amount of the metals of the VIII group would not act as the active site of the hydrofining catalyst.

Any metal of the group VIA may be used in the present invention, so long as it can be formulated into an aqueous solution. It is preferable to use Cr, Mo and W compounds. In particular, it is preferable to use ammonium bichromate $((NH_4)_2Cr_2O_7)$, ammonium p-molybdate tetrahydrate $((NH_4)_6Mo_7O_{24}\cdot4H_2O)$ and tungstic acid $(H_2WO_4)$. It is particularly preferable to use ammonium p-molybdate tetrahydrate among these compounds, since it is inexpensive and thus economically preferable and, furthermore, evolves a highly safe gas in the step of calcining.

Any metal of the group VIII may be used in the present invention, so long as it can be formulated into an aqueous solution. It is preferable to use Fe, Co, Ni, Pd, Pt, Os, Ir, Ru and Rh compounds. It is particularly preferable to use cobalt nitrate, nickel nitrate, cobalt sulfate, nickel sulfate, cobalt chloride, nickel chloride, nickel carbonate and cobalt carbonate. Among these compounds, cobalt nitrate and nickel nitrate are particularly preferable because of their high hydrofining activity.

It is preferable in the first and second catalysts according to the present invention that the hydrofining active components of the metals of the groups VIA and VIII are carried on the alumina-containing carrier in the form of oxides and/or sulfides.

This is because active species of the metals of the groups VIA and VIII are sulfides in the hydrofining processing, and oxides of these metals are easily converted into the corresponding sulfides.

These oxides can be obtained by calcining the carrier on which the hydrofining active components have been carried, as will be described hereinafter. On the other hand, the sulfides can be obtained by preliminarily sulfurizing the catalyst, as will be described hereinafter.

Regarding the content of the hydrofining active components carried in the first or second catalyst on the basis of the catalyst in terms of oxide, the content of a metal of the group VIA as an oxide $XO_3$, wherein X represents said metal, ranges from about 3 to 20% by weight, preferably from about 5 to 16% by weight, while the content of a metal of the group VIII as an oxide $M_xO_y$, wherein M represents said metal, ranges from about 0.5 to 10% by weight, preferably from about 1 to 5.5% by weight.

When the content of the metal of the group VIA is smaller than about 3% by weight, a preferable hydrofining activity cannot be obtained. When said content exceeds about 20% by weight, the dispersibility is deteriorated and, at the same time, the function as a promoter of the metal of the group VIII is sometimes suppressed.

When the content of the metal of the group VIII is smaller than about 0.5% by weight, a satisfactory hydrofining effect cannot be achieved. When said content exceeds about 10% by weight, a free hydrofining active component (i.e., the metal of the group VIII) which would not bind to the alumina-containing carrier increases.

In addition, the catalyst of the present invention may carry the third component other than the metals of the groups VIA and VIII, if necessary.

As examples of the third component, boron and phosphorus may be cited.

The content of the third component preferably ranges from about 1 to 10% by weight on the basis of the catalyst and in terms of oxide.

Different from the above-mentioned inorganic oxides such as boron oxide contained in the alumina-containing carrier, the third component is later carried on the alumina-containing carrier which has already contained the inorganic oxide. This third component acts as a promoter of the above-mentioned hydrofining active components and thus improves the demetallizing and denitrogenating activities of the first and second catalysts.

The third component may be blended by a method similar to those employed for the above-mentioned metals of the groups VIA and VIII. The third component may be blended either before, after or simultaneously with the addition of the metals of the groups VIA and VIII.

The carrier carrying the above-mentioned hydrofining active components optionally together with the third component is then separated from the impregnation or immersion solution, washed with water, dried and then calcined.

The drying and calcining may be performed under the same conditions as those described above regarding the alumina-containing carrier.

The first and second catalysts of the present invention preferably have a specific surface area of about 200 to 400 $m^2/g$, a total pore volume of about 0.4 to 0.9 ml/g, a bulk density of about 0.5 to 1.0 g/ml, a side break strength of about 0.8 to 3.5 kg/mm and an average pore size of about 80 to 300 Å.

It is preferable that the first and second catalysts of the present invention are preliminarily sulfurized prior to the use in the hydrofining of hydrocarbon oils.

The preliminary sulfurization can be effected at the usage (packing) site of the first and second catalysts of the present invention in a hydrofining column for hydrocarbon oils.

Namely, the first or second catalyst of the present invention is contacted with a sulfur-containing hydrocarbon oil (for example, a sulfur-containing distillate) at a temperature of about 150° to 400° C., under a (total) pressure of about 15 to 150 $kg/cm^2$ and at a liquid hourly space velocity of about 0.3 to 8.0 $hr^{-1}$ in the presence of a hydrogen-containing gas at a ratio of about 50 to 1500 l/l oil. After the completion of this treatment, the above-mentioned sulfur-containing distillate is replaced by a feedstock oil (sulfur-containing hydrocarbon oil) to be hydrofined and the operation is started under conditions which are suitable for desulfurizing said material oil.

In addition to the above-mentioned method, the first and second catalysts according to the present invention can be preliminarily sulfurized by contacting said catalysts with a sulfur compound such as hydrogen sulfide or by contacting said catalysts with an appropriate distillate to which a sulfur compound has been added.

The term "hydrocarbon oils" as used herein means light fractions obtained by distilling crude oil under atmospheric or vacuum conditions, normal distillation residues and vacuum distillation residues. As a matter of course, coker gas oil, solvent-deasphalted oil, tar sand oil, shale oil and liquefied coal oil are involved therein.

Conditions for hydrofining with the use of the first or second catalyst of the present invention may be optionally selected depending on the employed feedstock oil and the desulfurizing ratio. It is preferable to effect the hydrofining at a temperature of about 300° to 500° C., under a hydrogen pressure of about 50 to 200 kg/cm$^2$, at a ratio of hydrogen-containing gas (hydrogen concentration: about 60 to 100%) to the oil of about 50 to 10,000 l/l and at a liquid hourly space velocity of about 0.1 to 10 hr$^{-1}$.

The term "hydrofining" as used herein means a general name involving treatments wherein hydrocarbon oils are contacted with hydrogen, as described above. Thus, hydrogenation refining under reaction conditions of a relatively low severity, hydrogenation refining accompanied by some decomposition under reaction conditions of a relatively high severity, hydrogenation isomerization, hydrogenation dealkylation and other reactions of hydrocarbon oils in the presence of hydrogen are involved therein.

For example, the term "hydrofining" involves hydrodesulfurization, hydrodenitrogenation, hydrodemetallization and hydrocracking of a normal pressure distillate and vacuum distillate as well as hydrogenation refining of a kerosine fraction, a gas oil fraction, wax and a lubricating oil fraction.

In the first and second hydrofining catalysts according to the present invention, the metal of the group VIII carried thereon acts as an effective promoter. However, the Ni which is eliminated from the hydrocarbon oil together with other metals such as V during the hydrofining step exerts no promoting effect, different from the Ni carried on the catalyst.

This is seemingly because the Ni eliminated from the hydrocarbon oil exists in the catalyst in a state different from the Ni carried thereon.

This Ni not only exerts no promoting effect but also plugs pores in the catalyst to thereby prevent the penetration of the hydrocarbon oil into the catalyst, thus lowering the catalytic activity. Although the first or second catalyst of the present invention accumulates a significantly large amount of Ni and other metals (containing sulfur compounds) eliminated from the hydrocarbon oil, the penetration of the hydrocarbon oil into the catalyst is not prevented thereby and the decrease in the catalytic activity can be significantly suppressed.

Although reasons therefor have not been clarified in detail so far, it is assumed that the inorganic oxide constituting the carrier together with alumina might exert some effects of accelerating the penetration of the hydrocarbon oil into the catalyst and said inorganic oxide might make the hydrofining active components being carried in a specific state (thus showing the characteristic peak at $2\theta = 27°$ in the powder X-ray diffraction pattern thereof).

The hydrofining catalyst according to the present invention can achieve an excellent demetallizing activity, which makes it preferably usable in a pretreatment for hydrofining heavy oil.

As discussed above in detail, the first catalyst according to the present invention, wherein the alumina-containing carrier described above is used, showing the specific peak in the powder X-ray diffraction pattern thereof, and the second catalyst according to the present invention, wherein the alumina-containing carrier described above is used, showing the specific peak when Mo and Co are carried thereon, make it possible to achieve the following effects:

(1) eliminating metals and sulfur compounds from hydrocarbon oils at a high elimination efficiency; and (2) suffering from no decrease in catalytic activity and continuing excellent hydrofining, though a significantly large amount of these metals are accumulated therein;

which can never be obtained by conventional hydrofining catalysts having metals of the group VIA or metals of the group VIII on an alumina-containing carrier.

Accordingly, the first and second catalysts of the present invention, whereby lightening and improvement in qualities of petroleum products such as gas oil, normal distillation residue, vacuum gas oil and vacuum distillation residue can be satisfactorily made, are superior to conventional hydrofining catalysts from the viewpoint of effective utilization of heavy hydrocarbon oils.

The present invention is now described in more detail with reference to the following non-limiting examples.

EXAMPLE 1

To 50 litter of ion-exchanged water, were slowly added dropwise 29.8 kg of a sodium aluminate solution (containing about 23% of $Al_2O_3$) and 38.0 kg of an aluminum sulfate solution (containing about 7.9% of $Al_2O_3$). Then, the resulting solution was finally adjusted to pH 11 by adding the same sodium aluminate solution as described above.

The alumina slurry thus formed was filtered. The precipitate (alumina gel) thus filtered was repeatedly washed with water which was adjusted to pH 9 by adding ammonia. Then, after repeatedly washing again with water which was adjusted to pH 6 by adding nitric acid, an alumina cake was obtained.

This alumina cake was spray-dried to obtain an alumina powder, and the obtained alumina powder was humidified again by adding ion-exchanged water.

After adding 1.94 kg of boric acid, the mixture was kneaded in a kneader until it became sufficiently homogeneous. Next, the mixture was extruded from an extruder in such a manner as to give the necessary diameter of the catalyst and extruded into columns.

This extruded product was dried at 120° C. over one day and then calcined at 770° C. for 4 hours.

The composition of this alumina-containing carrier was $Al_{1.93}B_{0.07}O_{3.0}$.

1 kg of the alumina-containing carrier thus prepared was collected and metals of the groups VIA and VIII in the periodic table were carried thereon in the following manner.

230 g of ammonium p-molybdate tetrahydrate was completely dissolved in purified water so as to give a total volume of 1,000 cc.

Then, the aqueous solution thus obtained was carefully added dropwise to the above-mentioned alumina-containing carrier. After adding the whole aqueous solution, the mixture was allowed to stand for 1 hour and then dried in dry air, followed by calcining at 480° C. for 4 hours. Thus, molybdenum was carried on the carrier.

Separately, 121.6 g of nickel nitrate hexahydrate and 121.4 g of cobalt nitrate were dissolved in purified water so as to give a total volume of 1,000 cc.

Then, the aqueous solution thus obtained was carefully added dropwise to the above-mentioned catalyst. After adding the whole aqueous solution, the mixture was allowed to stand for 1 hour and then dried in dry air, followed by calcining at 480° C. for 4 hours. Thus, nickel and cobalt were held on the catalyst.

Table 1 shows the composition and properties of the catalyst thus obtained, while FIG. 1 shows the powder X-ray diffraction pattern thereof.

The powder X-ray diffraction was performed by using RINT (a product of Rigaku Denki K. K.) provided with a copper tube ball at a tube voltage of 40 KV, a tube current of 30 mA, a divergent slit of 1°, a scattering slit of 1° and a receiving slit of 0.30 mm.

EXAMPLE 2

By the same method as in Example 1, molybdenum was carried on 1 kg of the alumina-containing carrier prepared in Example 1 which showed a characteristic peak at 2θ=27° in the powder X-ray diffraction pattern when carrying both of Mo and Co, as FIG. 1 shows.

Subsequently, 243.2 g of nickel nitrate hexahydrate was dissolved in purified water so as to give a total volume of 1,000 cc. The aqueous solution thus obtained was carefully added dropwise to the above-mentioned catalyst carrying molybdenum. After adding the whole aqueous solution, the mixture was allowed to stand for 1 hour and then dried in air, followed by calcining at 480° C. for 4 hours. Thus nickel was carried on the catalyst.

Figure 2:
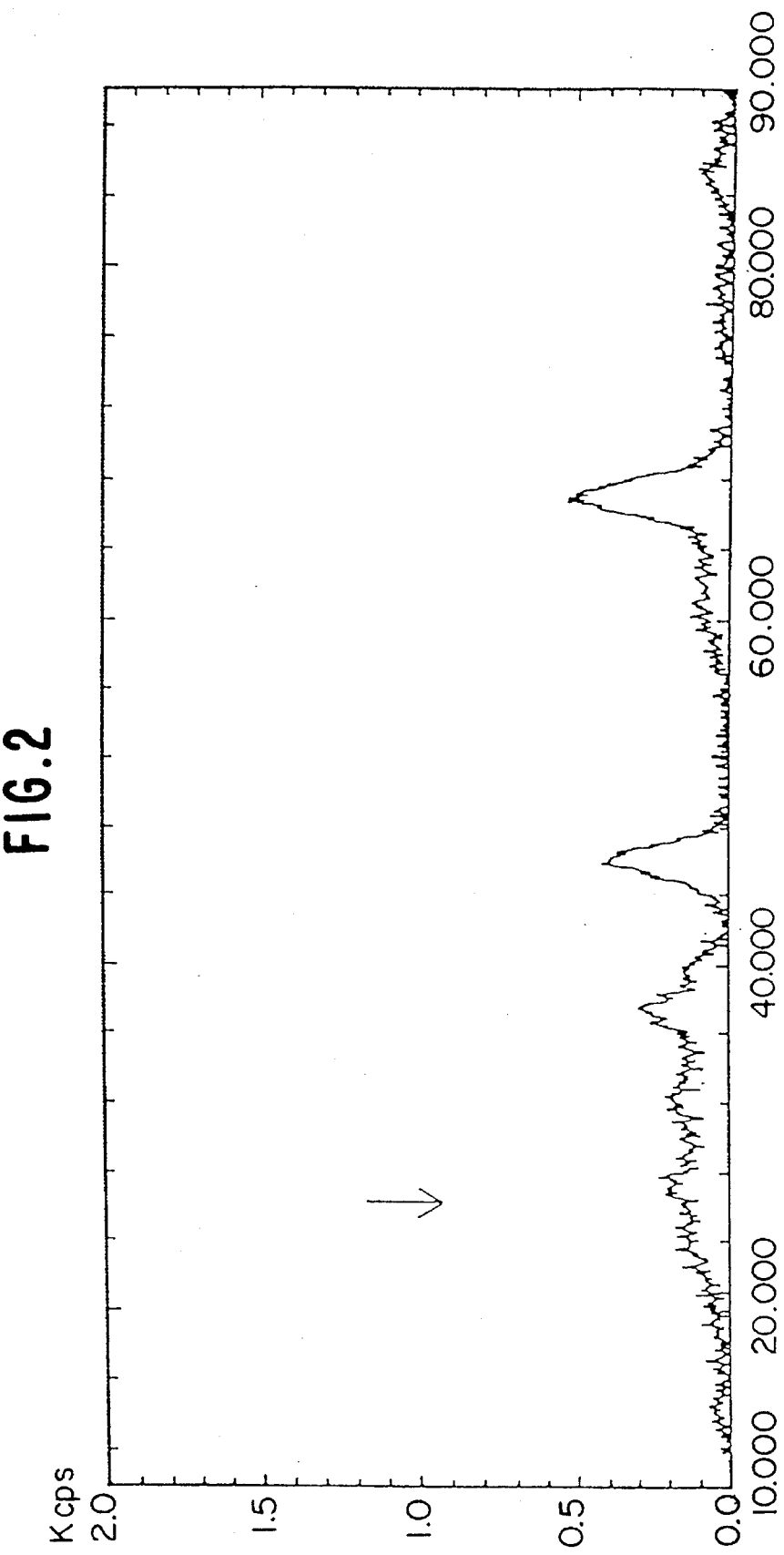

Table 1 shows the composition and properties of the catalyst thus obtained, while FIG. 2 shows the powder X-ray diffraction pattern thereof determined by the same method as in Example 1.

EXAMPLE 3

An extrusion-molded article prepared by the same method as in Example 1 was dried at 120° C. over one day and then calcined at 785° C. for 4 hours.

1 kg of the alumina-containing carrier thus prepared was collected and metals of the groups VIA and VIII in the periodic table were carried thereon in the following manner.

230 g of ammonium p-molybdate tetrahydrate was completely dissolved in purified water so as to give a total volume of 1,050 cc. Then, the aqueous solution thus obtained was carefully added dropwise to the above-mentioned alumina-containing carrier. After adding the whole aqueous solution, the mixture was allowed to stand for 1 hour and then dried in dry air, followed by calcining at 480° C. for 4 hours. Thus molybdenum was carried on the carrier.

Separately, 121.6 g of nickel nitrate hexahydrate and 121.4 g of cobalt nitrate were dissolved in purified water so as to give a total volume of 1,050 cc. Then, the aqueous solution thus obtained was carefully added dropwise to the above-mentioned catalyst. After adding the whole aqueous solution, the mixture was allowed to stand for 1 hour and then dried in air, followed by calcining at 480° C. for 4 hours. Thus, nickel and cobalt were carried on the catalyst.

Figure 3:
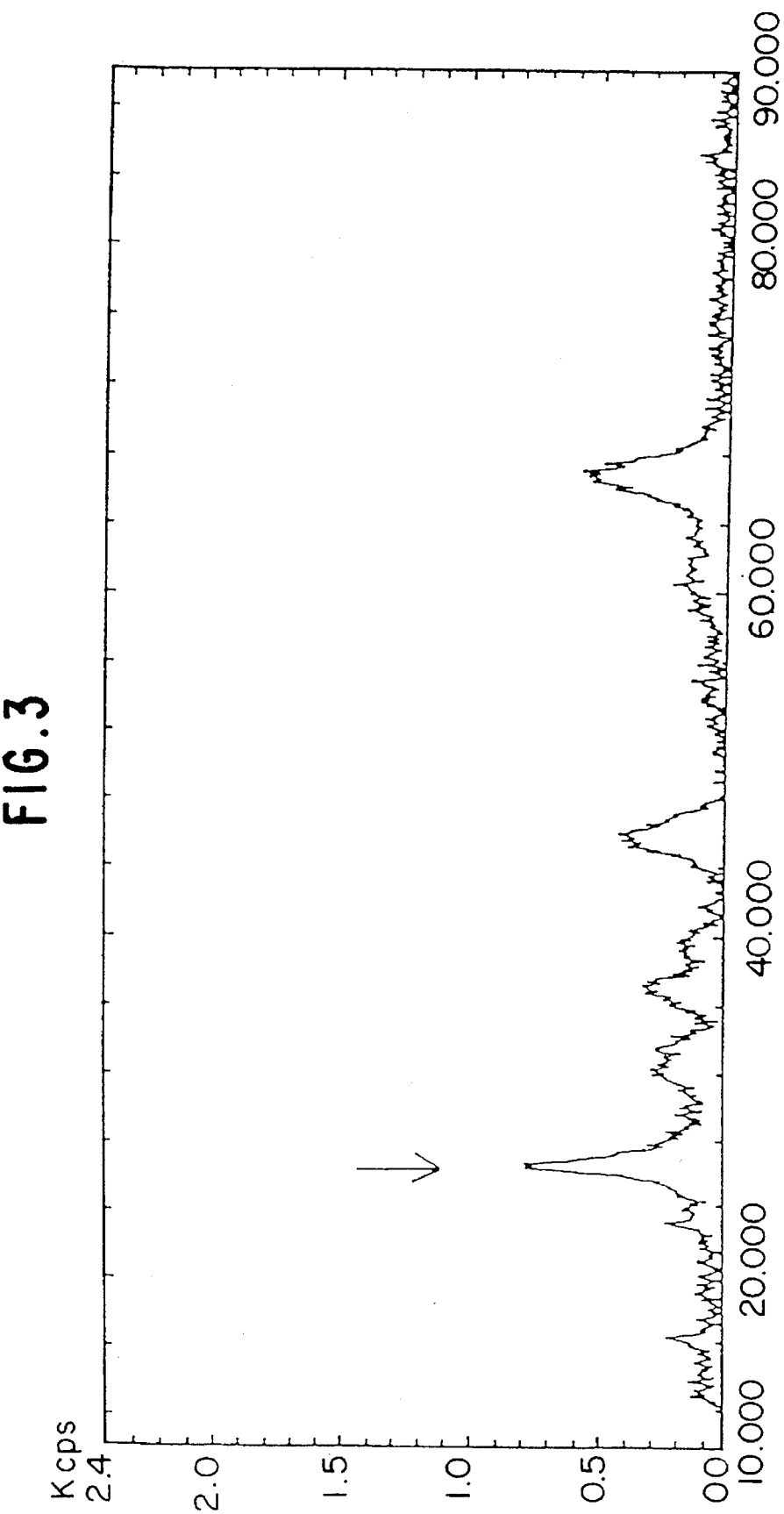
Figure 4:
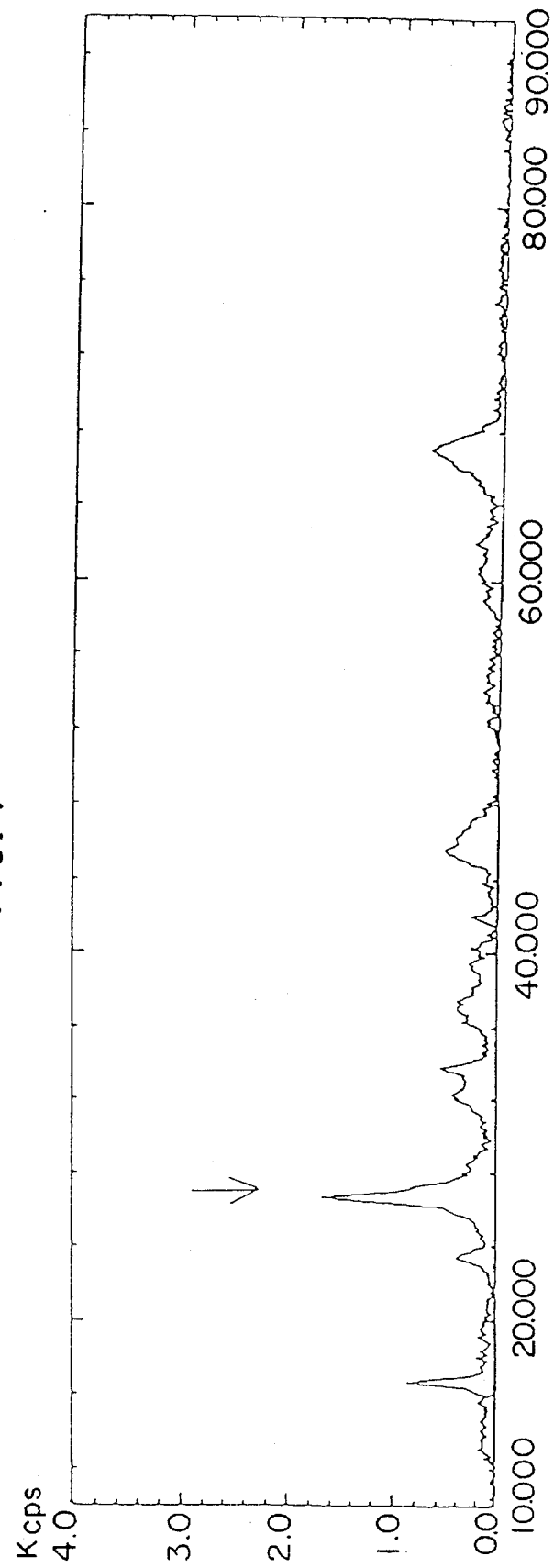
Figure 5:
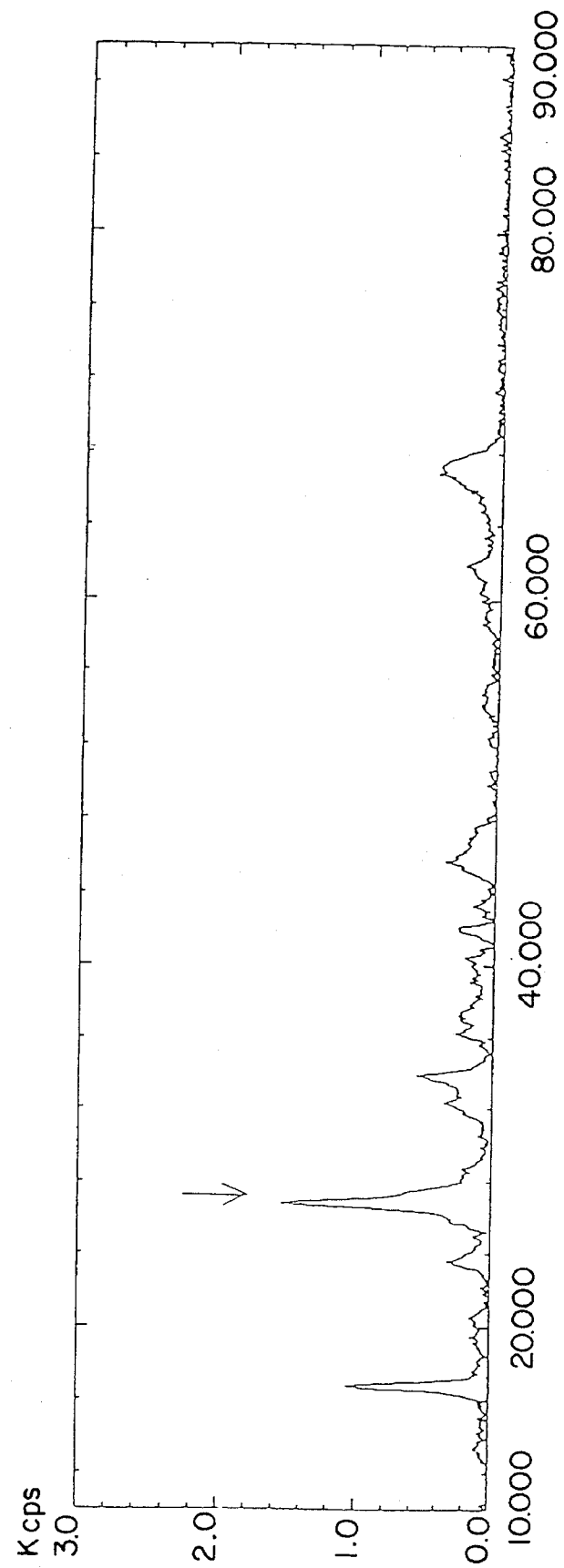
Figure 6:
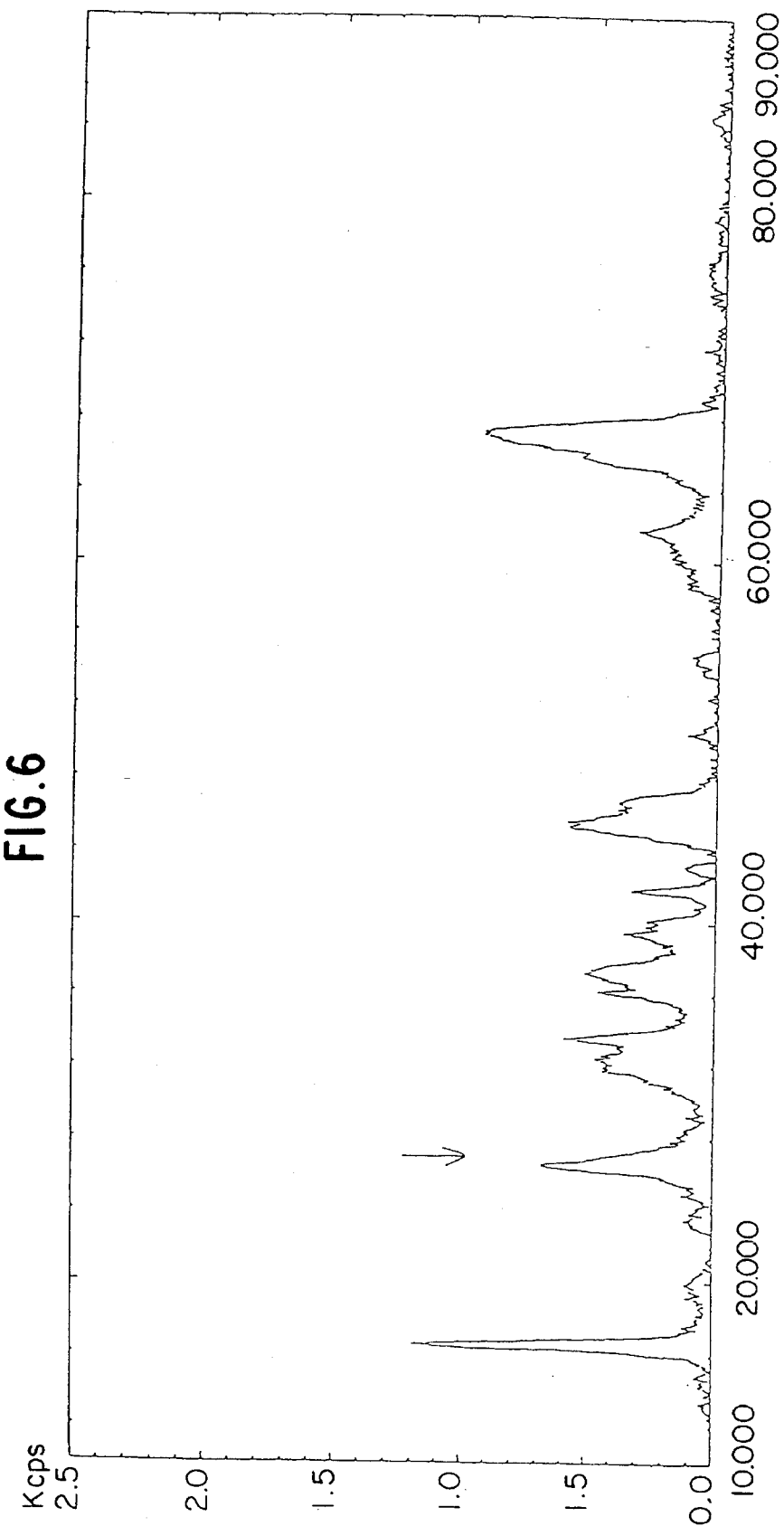
Figure 7:
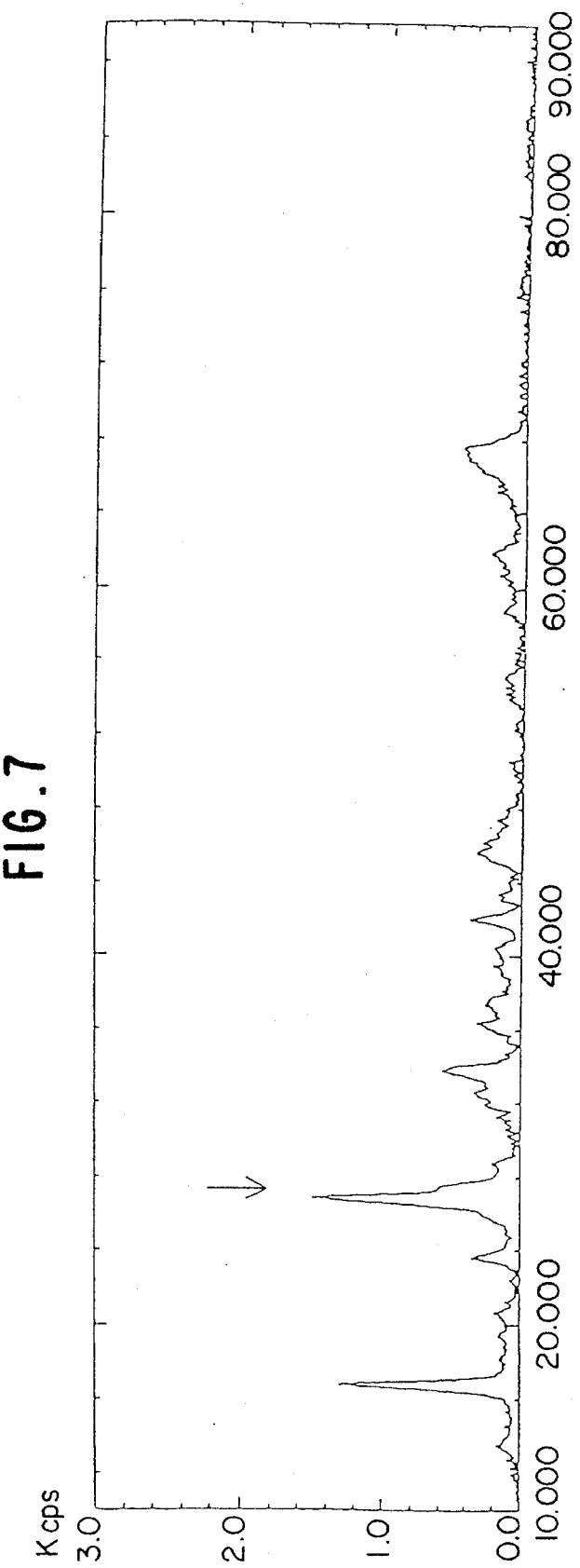
Figure 8:
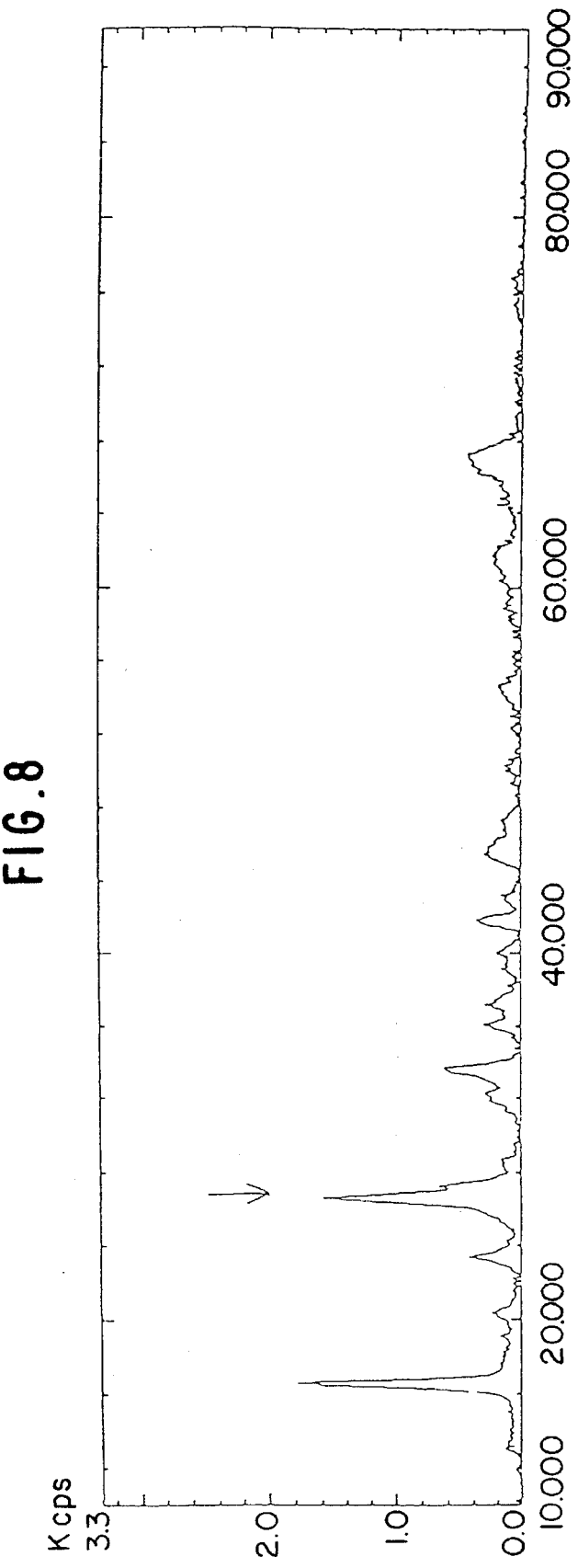

Table 1 shows the composition and properties of the catalyst thus obtained, while FIG. 3 shows the powder X-ray diffraction pattern thereof determined by the same method as in Example 1.

In each of Examples 4 to 12, an alumina-containing carrier was obtained by the same method as in Example 1 except that the calcining temperature was altered. Then, the active metals as specified in Table 1 were carried thereon by the same method as in Example 1 (in the case of a carrier of an average pore size of 100 Å or below) or by the same method as in Example 3 (in the case of a carrier of an average pore size exceeding 100 Å).

Table 1 shows the carried metals, temperatures for calcining the carriers and the compositions of the catalysts in detail as well as the properties of the catalysts thus obtained. Further, the powder X-ray diffraction patterns thereof determined by the same method as in Example 1 are given (FIGS. 4 to 8).

COMPARATIVE EXAMPLE 1

To 50 litter of ion-exchanged water, were slowly added dropwise 29.8 kg of a sodium aluminate solution (containing about 23% of $Al_2O_3$) and 38.0 kg of an aluminum sulfate solution (containing about 7.9% of $Al_2O_3$). Then the solution was finally adjusted to pH 11 by adding the same sodium aluminate solution as described above.

The alumina slurry thus formed was filtered. The precipitate (alumina gel) thus filtered was repeatedly washed with water which was adjusted to pH 9 by adding ammonia. Then, after repeatedly washing again with water which was adjusted to pH 6 by adding nitric acid, an alumina cake was obtained.

This alumina cake was spray-dried to obtain an alumina powder, and the obtained alumina powder was humidified again by adding ion-exchanged water.

Next, the mixture was extruded from an extruder in such a manner as to give the necessary diameter of the catalyst and extruded into columns.

This extruded product was dried at 120° C. over one day and then calcined at 700° C. for 4 hours.

1 kg of the alumina-containing carrier thus prepared was collected and metals of the groups VIA and VIII in the periodic table were carried thereon in the following manner.

230 g of ammonium p-molybdate tetrahydrate was completely dissolved in purified water so as to give a total volume of 1,000 cc. Then the aqueous solution thus obtained was carefully added dropwise to the above-mentioned alumina-containing carrier. After adding the whole aqueous solution, the mixture was allowed to stand for 1 hour and then dried in dry air, followed by calcining at 480° C. for 4 hours. Thus molybdenum was carried on the carrier.

Separately, 121.6 g of nickel nitrate hexahydrate and 121.4 g of cobalt nitrate were dissolved in purified water so as to give a total volume of 1,000 cc.

Then the aqueous solution thus obtained was carefully added dropwise to the above-mentioned catalyst carrying molybdenum. After adding the whole aqueous solution, the mixture was allowed to stand for 1 hour and then dried in dry air, followed by calcining at 480° C. for 4 hours.

Figure 9:
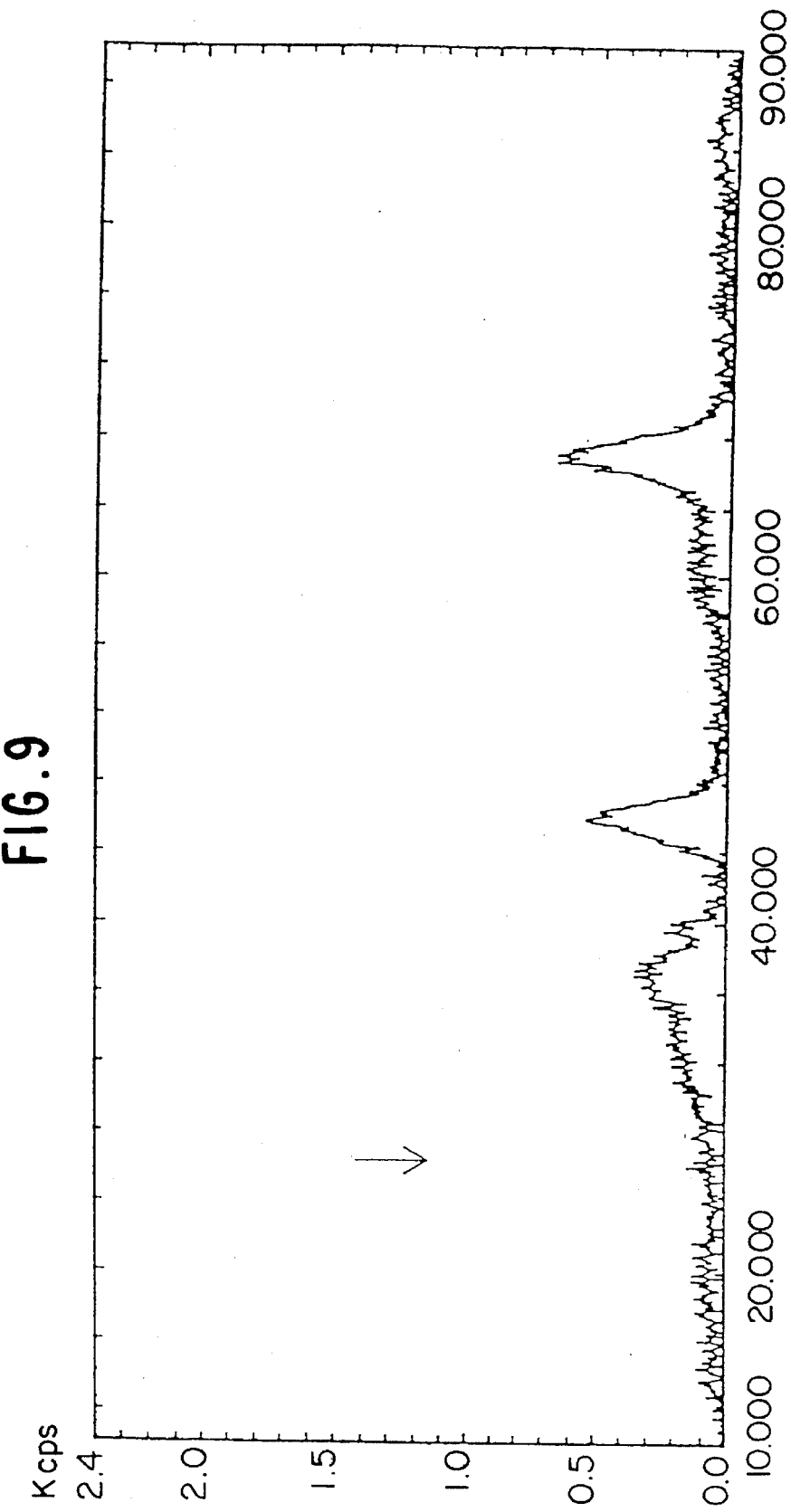
FIGS. 9 to 11 are diagrams showing the powder X-ray diffraction patterns of the catalysts obtained in Comparative Examples 1 to 3, respectively.

Table 1 shows the properties of the catalyst thus obtained, while FIG. 9 shows the powder X-ray diffraction pattern thereof determined by the same method as in Example 1.

COMPARATIVE EXAMPLE 2

The extrusion-molded article of Example 1 was dried at 120° C. over one day and then calcined at 700° C. for 4 hours. Next, active metals were carried thereon by the same method as described in Example 1 except that 124.0 g of ammonium p-molybdate tetrahydrate, 43.6 g of nickel nitrate hexahydrate and 43.7 g of cobalt nitrate were used.

Figure 10:
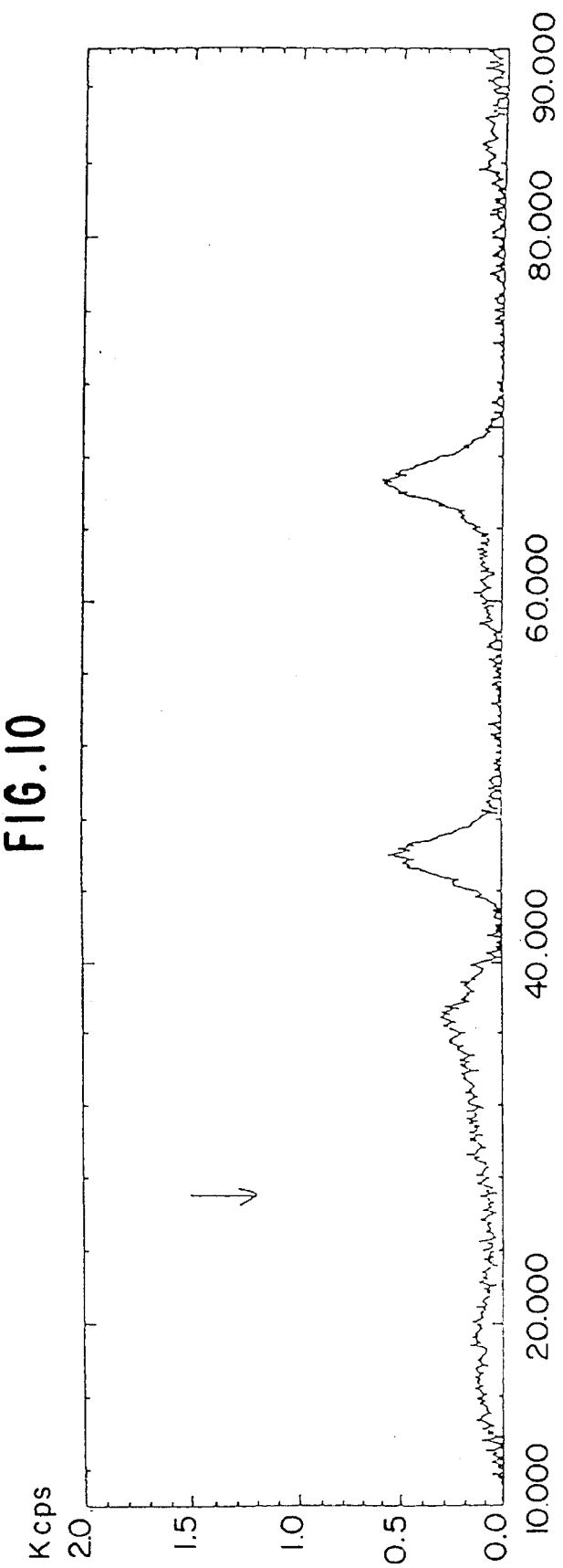

Table 1 shows the properties of the catalyst thus obtained, while FIG. 10 shows the powder X-ray diffraction pattern thereof determined by the same method as in Example 1.

COMPARATIVE EXAMPLE 3

The extrusion-molded article of Example 1 was dried at 120° C. over day and night and then calcined at 820° C. for 4 hours. Next, active metals were carried thereon by the same method as described in Example 3 except that 124.0 g of ammonium p-molybdate tetrahydrate, 43.6 g of nickel nitrate hexahydrate and 43.7 g of cobalt nitrate were used.

Figure 11:
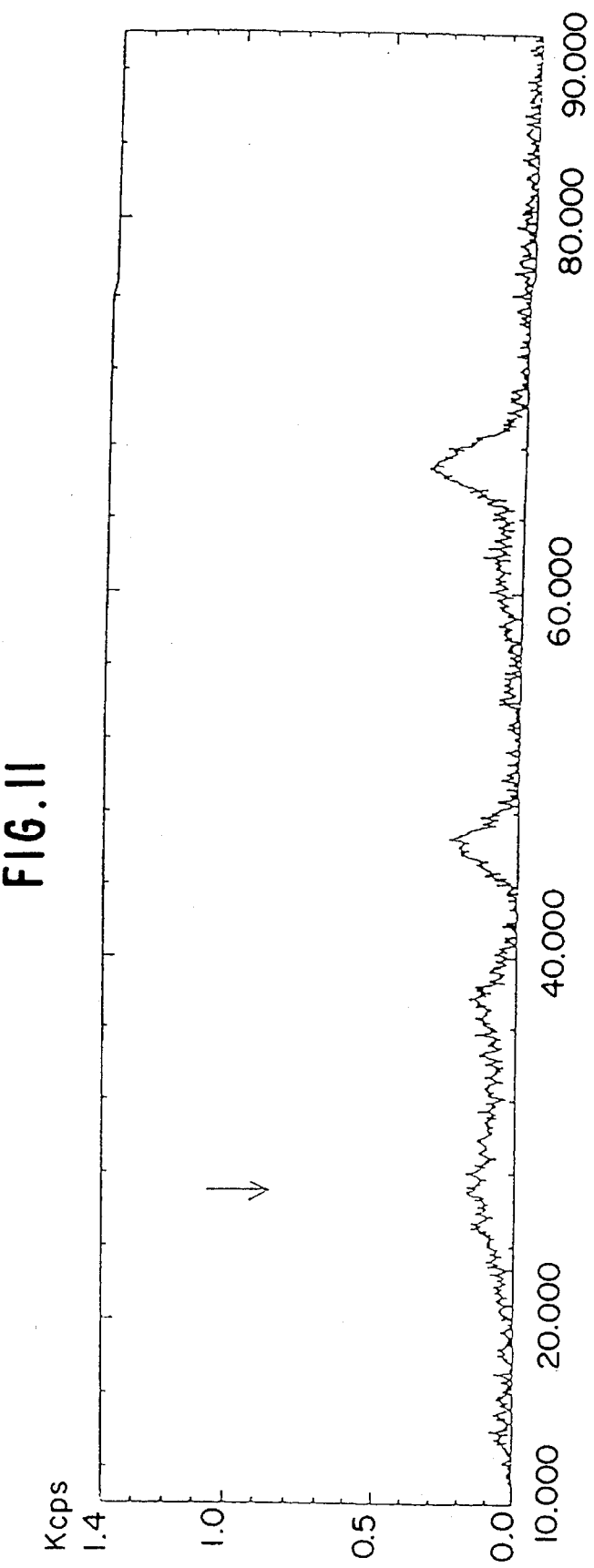

Table 1 shows the properties of the catalyst thus obtained, while FIG. 11 shows the powder X-ray diffraction pattern thereof determined by the same method as in Example 1.

TABLE 1

| | Carried Metals | | Kneaded inorganic oxide | Calcining temp. | X-ray pattern | Catalyst Composition Comp. (wt %) | Average pore size (Å) |
|---|---|---|---|---|---|---|---|
| | Group VIA Metal | Group VIII Metal | | | | | |
| Ex. 1 | ammonium p-molybdate tetrahydrate (230.0 g) | nickel nitrate hexahydrate (121.6 g) cobalt nitrate hexahydrate (121.4 g) | boron oxide | 770° C. | FIG. 1 | $MoO_3$ (15.2) NiO (2.5) CoO (2.6) | 85 |
| Ex. 2 | ammonium p-molybdate tetrahydrate (230.0 g) | nickel nitrate hexahydrate (243.2 g) | boron oxide | 770° C. | FIG. 2 | $MoO_3$ (14.9) NiO (5.0) | 85 |
| Ex. 3 | ammonium p-molybdate tetrahydrate (230.0 g) | nickel nitrate hexahydrate (121.6 g) cobalt nitrate hexahydrate (121.4 g) | boron oxide | 785° C. | FIG. 3 | $MoO_3$ (15.0) NiO (2.4) CoO (2.5) | 106 |
| Ex. 4 | ammonium p-molybdate tetrahydrate (229.9 g) | cobalt nitrate hexahydrate (242.7 g) | boron oxide | 770° C. | FIG. 4 | $MoO_3$ (15.1) CoO (5.0) | 87 |
| Ex. 5 | ammonium p-molybdate tetrahydrate (124.0 g) | nickel nitrate hexahydrate (43.7 g) cobalt nitrate hexahydrate (43.6 g) | boron oxide | 800° C. | FIG. 5 | $MoO_3$ (9.2) NiO (1.4) CoO (1.5) | 146 |
| Ex. 6 | ammonium p-molybdate tetrahydrate (124.0 g) | nickel nitrate hexahydrate (87.4 g) | boron oxide | 800° C. | FIG. 6 | $MoO_3$ (9.0) NiO (2.1) | 146 |
| Ex. 7 | ammonium p-molybdate tetrahydrate (79.1 g) | nickel nitrate hexahydrate (20.9 g) cobalt nitrate hexahydrate (20.9 g) | boron oxide | 810° C. | FIG. 7 | $MoO_3$ (6.0) NiO (0.6) CoO (0.7) | 165 |
| Ex. 8 | ammonium p-molybdate tetrahydrate (79.1 g) | nickel nitrate hexahydrate (87.4 g) | boron oxide | 810° C. | similar to FIG. 6 | $MoO_3$ (6.0) Nio (1.2) | 165 |
| Ex. 9 | ammonium p-molybdate tetrahydrate (124.0 g) | nickel nitrate hexahydrate (43.6 g) cobalt nitrate hexahydrate (43.7 g) | boron oxide | 830° C. | FIG. 8 | $MoO_3$ (9.0) NiO (1.1) CoO (1.0) | 185 |
| Ex. 10 | ammonium p-molybdate tetrahydrate (124.0 g) | nickel nitrate hexahydrate (87.4 g) | boron oxide | 830° C. | similar to FIG. 6 | $MoO_3$ (9.1) NiO (2.0) | 185 |
| Ex. 11 | tungstic acid (69.5 g) | nickel nitrate hexahydrate (41.8 g) | boron oxide | 810° C. | — | $WO_3$ (6.1) NiO (1.1) | 165 |
| Ex. 12 | ammonium p-molybdate tetrahydrate (39.4 g) tungstic acid (34.6 g) | nickel nitrate heiahydrate (12.5 g) cobalt nitrate hexahydrate (12.5 g) | boron oxide | 810° C. | — | $MoO_3$ (3.1) $WO_3$ (2.9) Nio (0.6) CoO (0.5) | 165 |
| Comp. Ex. 1 | ammonium p-molybdate tetrahydrate (230.0 g) | nickel nitrate hexahydrate (121.6 g) cobalt nitrate hexahydrate (121.6 g) | none | 700° C. | FIG. 9 | $MoO_3$ (15.0) NiO (2.5) CoO (2.4) | 83 |
| Comp. Ex. 2 | ammonium p-molybdate tetrahydrate (124.0 g) | nickel nitrate hexahydrate (43.6 g) cobalt nitrate hexahydrate (43.7 g) | boron oxide | 700° C. | FIG. 10 | $MoO_3$ (15.0) NiO (2.5) CoO (2.5) | 65 |
| Comp. Ex. 3 | ammonium p-molybdate tetrahydrate (124.0 g) | nickel nitrate hexahydrate (43.6 g) cobalt nitrate hexahydrate (43.7 g) | none | 820° C. | FIG. 11 | $MoO_3$ (9.0) NiO (1.0) | 178 |

Evaluation of Catalytic Activity

The catalysts obtained in the Examples and Comparative Examples were examined by a test for evaluating the relative hydrodesulfurizing and hydrodemetallizing activities under the conditions as specified in Table 2.

Table 3 shows the results.

TABLE 2

(Test conditions for evaluating relative hydrodesulfurizing and hydrodemetallizing activities)

Properties of feedstock oil, i.e., atmospheric residue (Iranian heavy):

| | |
|---|---|
| Sulfur concentration (wt %): | 3.23 |
| Vanadium (ppm): | 119 |
| Nickel (ppm): | 39 |

TABLE 2-continued (Test conditions for evaluating relative hydrodesulfurizing and hydrodemetallizing activities)

Test conditions:

| | |
|---|---|
| Reaction temperature (°C.): | 390 |
| Reaction pressure (kg/cm²G): | 105 |
| Liquid hourly space velocity (hr⁻¹): | 1.0 |
| Hydrogen/Feedstock oil | |
| (NL/L): | 1068 |
| (scf/bbl): | 6000 |

Device: High-pressure flow-through reactor of fixed bed type

The relative hydrodesulfurizing and hydrodemetallizing activities were evaluated under the operation conditions as specified in Table 2 by determining the residual sulfur content (% by weight), vanadium content (ppm) and nickel content (ppm) of each reaction product on the 90th day and calculating the reaction velocity constant in accordance with the following equation.

$$Ks = (1/Sp - 1/Sf) \times LHSV \quad (1)$$

Sp: sulfur content of purified oil.
Sf: sulfur content of feedstock oil.

$$Km = -Ln(Mp/Mf) \times LHSV \quad (2)$$

Ln: natural logarithm.
Mp: metal concentration of purified oil.
Mf: metal concentration of feedstock oil.

TABLE 3

| | Relative desulfurizing activity | Relative demetallizing activity |
|---|---|---|
| Ex. 1 | 95 | 125 |
| Ex. 2 | 94 | 121 |
| Ex. 3 | 85 | 137 |
| Ex. 4 | 105 | 105 |
| Ex. 5 | 70 | 130 |
| Ex. 6 | 65 | 132 |
| Ex. 7 | 58 | 145 |
| Ex. 8 | 52 | 147 |
| Ex. 9 | 40 | 152 |
| Ex. 10 | 35 | 155 |
| Ex. 11 | 43 | 134 |
| Ex. 12 | 48 | 141 |
| Comp. Ex. 1 | 100 | 100 |
| Comp. Ex. 2 | 101 | 87 |
| Comp. Ex. 3 | 51 | 63 |

The catalysts obtained in the Examples and Comparative Examples were examined by a test for evaluating the relative metal tolerance under the conditions as specified in Table 4.

TABLE 4

(Test conditions for evaluating relative metal tolerance)
Properties of feedstock oil, i.e., Boscan crude oil:

| | |
|---|---|
| Sulfur concentration (wt %): | 4.46 |
| Vanadium (ppm): | 1200 |
| Nickel (ppm): | 120 |
| Test conditions: | |
| Reaction temperature (°C.) | 395 |
| Reaction pressure (kg/cm²G) | 145 |
| Liquid hourly space velocity (hr⁻¹): | 0.5 |
| Hydrogen/Feedstock oil (scf/bbl): | 10000 |

Device: High-pressure flow-through reactor of fixed bed type

The relative metal tolerance was evaluated under the operation conditions as specified in Table 4 by determining the accumulated metals on the basis of the catalyst at a desulfurizing ratio of 20% (residual sulfur concentration: 3.57%) as a metal tolerance.

Table 5 shows the results.

TABLE 5

| | Relative metal tolerance |
|---|---|
| Example 1 | 118 |
| Example 2 | 120 |
| Example 3 | 132 |
| Example 4 | 110 |
| Example 5 | 170 |
| Example 6 | 170 |
| Example 7 | 184 |
| Example 8 | 184 |
| Example 9 | 210 |
| Example 10 | 210 |
| Example 11 | 180 |
| Example 12 | 182 |
| Comp. Example 1 | 100 |
| Comp. Example 2 | 79 |
| Comp. Example 3 | 180 |

While the invention has been described in detail and with reference to specific embodiments thereof, it will be apparent to one skilled in the art that various changes and modifications can be made therein without departing from the spirit and scope thereof.

What is claimed is:

1. A catalyst for hydrofining hydrocarbon oils which comprises (i) an alumina-containing carrier which comprises from about 5 to 40% by weight, on the basis of the catalyst, of boron oxide in addition to the alumina, said alumina-containing carrier carrying thereon (ii) hydrofining-active components, which comprise Mo and Co or one or more metals selected from among metals of group VIA of the periodic table other than Mo and metals of group VIII of the periodic table other than Co, together with Mo and Co, wherein said alumina-containing carrier shows a peak at 2Θ of 27° in the powder X-ray diffraction pattern; and wherein said hydrofining-active components are from 3 to 20% by weight, in terms of oxide, or a metal of group VIA of the periodic table and from 0.5 to 10% by weight, in terms of oxide, or a metal of group VIII of the periodic table.

2. A catalyst for hydrofining hydrocarbon oils as claimed in claim 1, which further comprises as said (ii) hydrofining-active components:

from 3 to 20% by weight, in terms of oxide, of $MoO_3$ and from 0.5 to 10% by weight, in terms of oxide, of CoO, NiO or both CoO and NiO on said alumina-containing carrier.

3. The catalyst of claim 1 which is formed by a process which includes the steps of blending said alumina with said boron oxide and calcining in air at a temperature of from about 600° to 900° C.

4. The catalyst of claim 2, wherein said calcining is at a temperature in the range of from about 750° to 870° C.

5. The catalyst of claim 2 which is formed by a process which includes the steps of blending said alumina with said boron oxide and calcining in air at a temperature in the range of from about 600° to 900° C.

6. The catalyst of claim 5, wherein said calcining temperature is in the range of from about 750° to 870° C.

* * * * *

UNITED STATES PATENT AND TRADEMARK OFFICE
CERTIFICATE OF CORRECTION

PATENT NO. : 5,494,875
DATED : February 27, 1996
INVENTOR(S) : Kazushi Usui et al It is certified that error appears in the above-indentified patent and that said Letters Patent is hereby corrected as shown below:

Column 14, line 58, change "2" to --3--.

Signed and Sealed this

Thirtieth Day of July, 1996

Attest:

BRUCE LEHMAN

Attesting Officer     Commissioner of Patents and Trademarks